(12) United States Patent
Thompson et al.

(10) Patent No.: US 6,438,354 B2
(45) Date of Patent: Aug. 20, 2002

(54) RECONFIGURABLE SATELLITE AND ANTENNA COVERAGE COMMUNICATIONS BACKUP CAPABILITIES

(75) Inventors: James D. Thompson, Manhattan Beach; Parthasarathy Ramanujam, Redondo Beach; Cynthia A. Dixon, Rancho Palos Verdes; Debbie H. Feuerborn, Cerritos; David R. Goldberg, Redondo Beach; Stephen F. Sichi, Los Angeles; Lomash J. Shah, Redondo Beach; John R. Dunwoody, Long Beach, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/222,419

(22) Filed: Dec. 23, 1998

(51) Int. Cl.[7] ............................................. H04B 7/185
(52) U.S. Cl. ......................... 455/12.1; 455/427; 455/8
(58) Field of Search ................. 455/427, 428, 455/450, 12.1, 13.3, 13.2, 266, 275, 209, 196.1, 260, 8

(56) References Cited

U.S. PATENT DOCUMENTS

| | | | | |
|---|---|---|---|---|
| 5,813,634 A | * | 9/1998 | Pizzicaroli et al. | 455/12.1 |
| 5,929,804 A | * | 7/1999 | Jones et al. | 342/354 |
| 5,936,588 A | * | 8/1999 | Rao et al. | 343/754 |
| 5,956,620 A | * | 9/1999 | Lazaris-Brunner et al. | 455/12.1 |
| 5,963,845 A | * | 10/1999 | Floury et al. | 455/12.1 |
| 5,978,653 A | * | 11/1999 | Taylor et al. | 455/13.1 |
| 6,021,309 A | * | 2/2000 | Sherman et al. | 455/12.1 |
| 6,031,502 A | * | 2/2000 | Ramanujam et al. | 343/761 |
| 6,055,431 A | * | 4/2000 | Dybdal | 455/450 |
| 6,192,217 B1 | * | 2/2001 | Farrell | 455/13.1 |

* cited by examiner

*Primary Examiner*—Vivian Chin
*Assistant Examiner*—Duc Nguyen
(74) *Attorney, Agent, or Firm*—Terje Gudmestad

(57) ABSTRACT

A reconfigurable payload for a satellite having a flexible antenna system, a variable downconverter technology and a filter technology that all work in combination to allow the payload of a satellite to be reconfigured in orbit.

16 Claims, 4 Drawing Sheets

RECONFIGURABLE SATELLITE AND ANTENNA COVERAGE COMMUNICATIONS BACKUP CAPABILITIES

CROSS REFERENCE TO RELATED APPLICATIONS

This application is related to co-pending U.S. patent application Ser. No. 09/222,420, entitled "A Rotatable Scannable Reconfigurable Shaped Reflector With a Movable Feed System" filed simultaneously with the present application, the subject matter of such co-pending application being incorporated herein by reference.

TECHNICAL FIELD

The present invention relates to space and communications satellites, and more particularly, to a reconfigurable payload for a satellite so that it may mimic many payloads to provide backup services for many different satellites or to be used as a flexible stand alone satellite.

BACKGROUND ART

Satellite fleet operators depend on continuity of service for a satellite in order to maintain continuous service to satellite users. In the event of a satellite failure, a backup service is needed to avoid extended inconvenience to users, or to avoid the risk of users being lost to a competitor before a backup satellite can be ordered, built and launched.

In many applications, a satellite's frequency plan and coverage is unique. In some cases, the satellite customer does not have prior knowledge of his customers. Therefore, a reconfigurable satellite provides in-orbit flexibility. If a customer base changes while the satellite is in orbit, it can be reconfigured to provide service. In the situation of providing backup services, a unique spare satellite would be required for each satellite in a fleet of satellites.

A backup satellite having the capability to be reconfigured would avoid the expensive option of a unique spare. A satellite having a communication payload that can be reconfigured in space so that it mimics various payloads with various frequency plans and antenna coverages would allow a single satellite to provide backup services to many different satellites. In addition, a reconfigurable payload would allow a satellite fleet operator to provide a replacement satellite relatively quickly in the event of a satellite failure.

A satellite having a communication payload that can be reconfigured in space so that it mimics various payloads with various frequency plans and antenna coverages would allow a single satellite to provide services to many different customers over the lifetime of the satellite. A reconfigurable payload would allow a satellite fleet operator to have flexibility in-orbit. This allow the operator to procure and build a reconfigurable satellite while marketing satellites to various customers. The result is a satellite that is ready for orbit quicker, and ready to provide services sooner.

SUMMARY OF THE INVENTION

The present invention is a communication payload that can be reconfigured in space such that it mimics many payloads with various frequency plans and antenna coverages. The combination of a flexible antenna system and an agile repeater capable of handling various uplink and downlink frequency plans makes a reconfigurable payload possible.

Three technologies are combined to make a reconfigurable payload for a satellite; a flexible coverage pattern, a variable downconverter technology, and sufficiently filtered channels across the downlink bandwidth. There are several variations to each of these three technologies, each combinable with the others.

A flexible coverage pattern can be provided by any one of the following methods: a dual reflector antenna configuration that is steerable, rotateable, and/or defocusable used as a standalone antenna or as part of a farm of antennas, a single reflector antenna configuration that is steerable, rotateable and/or defocusable used as a stand alone or in a farm of antennas, or a reconfigurable phased array either direct radiating or reflecting off either a dual or a single antenna system.

The variable downconverter technology can be provided by any means. It is possible to use downconverters that have either local or external oscillators. The frequency is generated either by a frequency synthesizer or switching between multiple fixed oscillators of various frequencies. Another frequency selecting alternative is groups of switchable downconverters using fixed oscillators.

Channels across the downlink bandwidth can be sufficiently filtered using a sufficient number of input multiplex (IMUX) filters to channelize every channel of the potential receive spectrum. Additionally, a sufficient number of output multiplex (OMUX) filters to channelize every channel of the potential transmit spectrum is also used. A sufficient number of switches are used to access IMUX and OMUX filters, along with a method of routing channels between IMUX filters, OMUX filters, switches and high power amplifiers.

It is an object of the present invention to improve the backup capabilities of satellite systems.

It is another object of the present invention to provide a satellite payload that can be reconfigured to mimic the payload of many different satellites, thereby improving backup capabilities without the cost prohibitive option of individual backup satellites.

It is still another object of the present invention to provide a flexible antenna configuration, a selectable uplink and downlink frequency plan, and a channelized filter system to have reconfigurable payload capabilities for a satellite.

Other objects and features of the present invention will become apparent when viewed in light of the detailed description of the preferred embodiment when taken in conjunction with the attached drawings and appended claims.

BEST MODE FOR CARRYING OUT THE INVENTION

Three separate technologies are utilized in one spacecraft to allow a communications payload of a satellite to be reconfigured in space such that it may mimic many payloads with various frequency plans and antenna coverages for providing backup services for failed satellites. Flexible antenna coverage, variable downconverter technology and channels sufficiently filtered across the downlink bandwidth are all necessary, in combination, to achieve reconfiguration of the satellite in space.

A typical, non-reconfigurable spacecraft has "shaped" antenna coverage. To generate the strongest received signal on the ground, a shaped coverage pattern transmits the maximum amount of the available power to the intended coverage area and the minimum amount of power to undesired areas. For example, an English language direct-to-home satellite system might broadcast to the United States and Canada while it would not transmit to adjacent ocean regions and Mexico.

The shape of the desired coverage pattern varies from satellite to satellite. A beam covering the United States varies significantly from a beam covering Japan or Europe. Even two satellites covering the same areas may require different shaped beams if they are located at two different orbital locations.

For a reconfigurable satellite to be flexible and to mimic a variety of satellites, the satellite must be able to change its coverage pattern in orbit. A broadband flexible antenna coverage is necessary in a reconfigurable spacecraft design. The broadband nature of the antenna is required so that the same antennas may receive or transmit any of the desired uplink and downlink frequencies. To the extent that the antennas are not sufficiently broadband, additional antennas will be required, (i.e. separate transmit and receive antennas). However, there is a significant increase in weight and therefore, cost associated with additional antennas.

There are several technologies available to accomplish this goal. For example, pointable, rotateable, defocusable antennas mounted to the nadir, or earth-facing, side of the spacecraft can be rotated, pointed and defocused to provide coverage for any desired area.

Figure 1A:
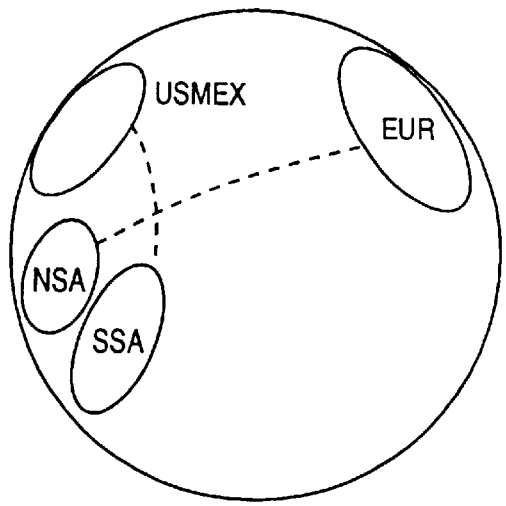
FIG. 1A is an example of a coverage pattern for four Ku-band antennas on a reconfigurable satellite of the present invention.
Figure 1B:
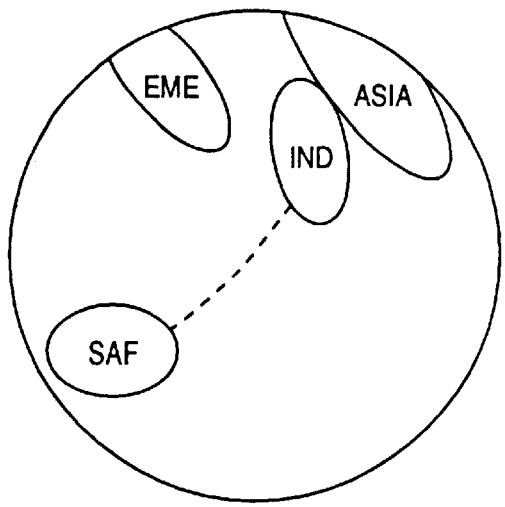
FIG. 1B is an example of a different coverage pattern for four Ku-band antennas on the reconfigurable satellite of the present invention.
Figure 1C:
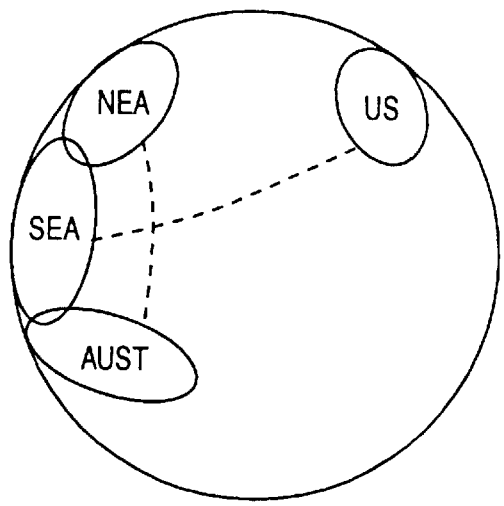
FIG. 1C is an example of another coverage pattern for four Ku-band antennas on the reconfigurable satellite of the present invention.

FIGS. 1A through 1C are examples of three such coverage patterns for four Ku-band antennas. It should be noted that while Ku-band antenna coverage is shown, it is for example purposes and the present invention can be applied to C-band and Ka-band operation as well. FIG. 1A is the Atlantic Ocean Region (AOR) including the United States, Mexico, Northern South America, Southern South America and Europe. FIG. 1B is the Indian Ocean Region (IOR) including Europe and the Middle East, India, Asia, and South Africa. FIG. 1C is the Pacific Ocean Region (POR) including Northeast Asia, Southeast Asia, Australia and the United States. These are examples of the different shaped antenna patterns in a satellite fleet.

Other technologies may be used to accomplish the same effect. For example, reconfigurable phased array antennas or steerable spot beam antennas, or a combination are well known antenna technologies that can change their coverage patterns in orbit. In the preferred embodiment, there are six (6) antennas in the system. Two operate at C-band and four operate at Ku-band. All of the antennas are Gregorian dual-reflector antennas with a rotateable main reflector. The four Ku-band antennas also use feed defocusing which facilitates beam shape variation in orbit. The function of the antenna system is to generate beams covering the many different areas covered by existing satellites in a fleet of satellites, for example, the three ocean regions shown in FIGS. 1A through 1C.

A reconfigurable payload can be realized by combining a type of flexible antenna coverage technology with variable uplink and downlink frequency technologies and sufficient filtering technologies.

Variable downconverter technology is the next piece of the present invention. The frequency at which a signal is transmitted to a satellite is known as the uplink frequency. The frequency at which the signal is broadcast back down to the ground is referred to as the downlink frequency. The uplink and downlink frequencies must be different from each other to avoid interference with each other. The process of changing a signal from the uplink frequency to the corresponding downlink frequency is known as downconversion. This is because the uplink frequency is generally higher than the downlink frequency. And, for obvious reasons, in cases where the uplink frequency is lower than the downlink frequency, the process is called upconversion.

Upconverters and downconverters use an analog technology known as a mixer. A mixer takes the input of two voltage signals and outputs their product. To downconvert (or upconvert) a signal, the mixer is fed by the uplink signal and an oscillator operating at a frequency equal to the difference between the uplink and downlink frequencies. The mixer outputs the product of the frequencies equal to the desired downlink frequency.

Figure 2:
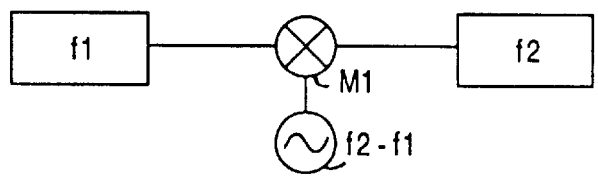
FIG. 2 is a block diagram of a single conversion mixer with a fixed oscillator.

An example of a single conversion mixer with a fixed oscillator is shown in FIG. 2. The uplink signal has a frequency, f1. The downlink signal has a frequency, f2. An oscillator operates at a frequency that, when mixed with the uplink signal, produces a downlink signal f2. A wide range of oscillator frequencies are used by satellites to perform up and down conversions. Therefore, a satellite attempting to mimic the operating of existing or future satellites must be able to mimic the frequencies of the oscillators on board any one of many satellites.

Typically, on a satellite, the device containing the mixer is inside a box known as either a downconverter, or if a low noise amplifier is also inside the box, it is known as a receiver. In both cases, the oscillator may be either internal or external to the box. When the oscillator is internal to the box, it is called a local oscillator. Local oscillators are typically generated by the use of crystals operating at precise predetermined frequencies.

There are a several technologies available that generate a variety of frequencies. One way is to switch between a variety of up and down converters, each with its own local oscillator, or to use an up (or down) converter fed by a variety of switchable oscillators each operating at a different frequency. An example of this arrangement is shown in FIG. 3.

Figure 3:
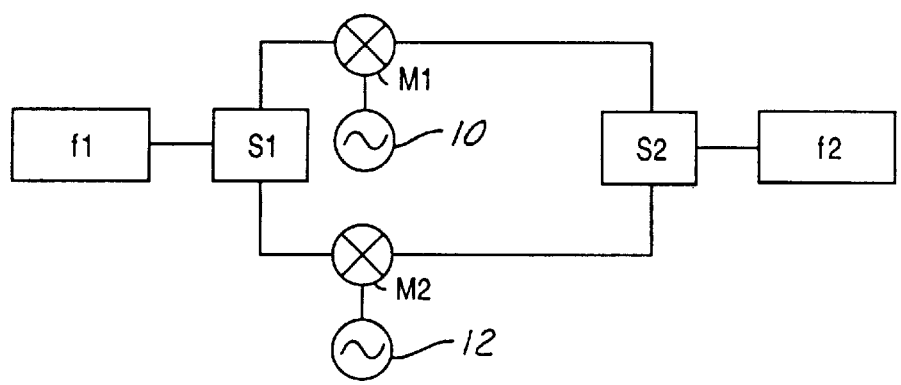
FIG. 3 is a block diagram of multiple downconverters for selectable downconversion frequencies.

There is shown in FIG. 3 an uplink signal having a frequency f1 a switch S1 selects between a first mixer, M1 and a second mixer, M2. A second switch S2 selects between the mixers M1 and M2 and outputs the desired downlink frequency. Each of the mixers M1 and M2 is connected to an independent oscillator 10 and 12 having fixed frequencies. The first oscillator 10 is connected to the mixer M1 and operates at a frequency of f2-f1. The second oscillator 12 is connected to the second mixer, M2 and operates at a frequency f3-f1.

Depending on which switch path is selected, the downlink frequency can be selected as either f2 or f3. When switch S1 is selected, the output of the mixer is the downlink frequency f2 and when switch S2 is selected the output of the mixer is the downlink frequency f3. Obviously, the complexity of the switching system depends on the number of switches, mixers and oscillators and can be modified as necessary.

Figure 4:
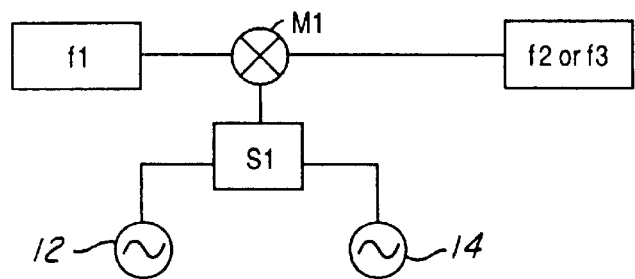
FIG. 4 is a block diagram for selectable downconversion frequency using multiple switched oscillators.

An alternative method is to use a down (or up) converter fed by a variety of switchable oscillators each operating at a different frequency. An example of this arrangement is shown in FIG. 4. The uplink signal is operating at frequency f1 and is fed into a mixer M1 that produces the downlink signal. A switch, S1, allows desired frequencies to be selected from multiple oscillators. In the FIG. 4 example, two independent oscillators are shown 12 and 14, each operating at a different frequency. Oscillator 12 operates at a frequency f2-f1 and oscillator 14 operates at a frequency of f3-f1. Therefore, depending on which oscillator is selected by switch S1 and mixed with uplink frequency f1 in mixer M1, the downlink frequency will be f2 or f3. It is to be understood that any number of oscillators may be employed.

In the configuration shown in FIG. 4, there is the potential for in-band spurious signals to degrade the quality of the communication signal. A spurious signal, also called a spur, is an undesired tone generated by the non-linear properties inherent to mixers. The severity of a spur is a function of the signal and local oscillator frequencies. There is an alternative method to downconvert, without the drawback of spurs. A dual conversion design eliminates spurs by first downconverting the signal to an intermediate frequency (IF) and then performing a second conversion to the desired downlink frequency.

The output of the mixer is a product of frequencies, which also includes a product of harmonics of those frequencies. These harmonics, or spurs, may be close in frequency to the desired signal making it difficult to filter out the undesired frequencies. Carefully selecting an intermediate frequency will avoid interference from potential harmonics the sums and differences of the receive and local oscillator signals that are near the desired downlink signal.

Figure 5:
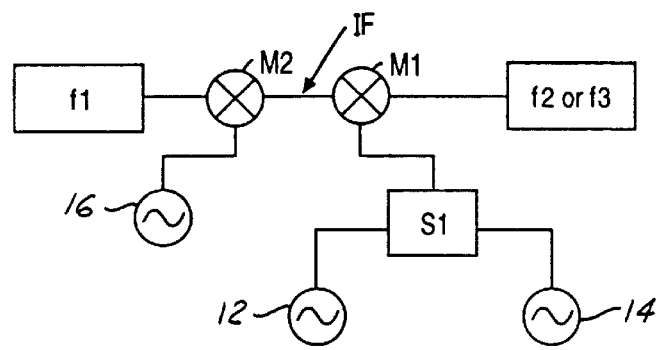
FIG. 5 is a block diagram of multiple fixed oscillators in a dual conversion configuration.

FIG. 5 is a block diagram of a downconverter having multiple fixed oscillators in a dual conversion configuration to select different downlink frequencies from the same downconverter without the potential for spurs by using an intermediate frequency (IF). The arrangement is similar to the one shown in FIG. 4. However, there is an additional mixer M2 and an oscillator 16 operating at a frequency that, when mixed with the uplink frequency f1 will output a predetermined intermediate frequency (IF). The intermediate frequency (IF) is mixed with the signal from either oscillator 12 having a frequency of f2-IF or oscillator 14 having a frequency of f3-If to output the downlink frequency either f2 or f3.

Figure 6:
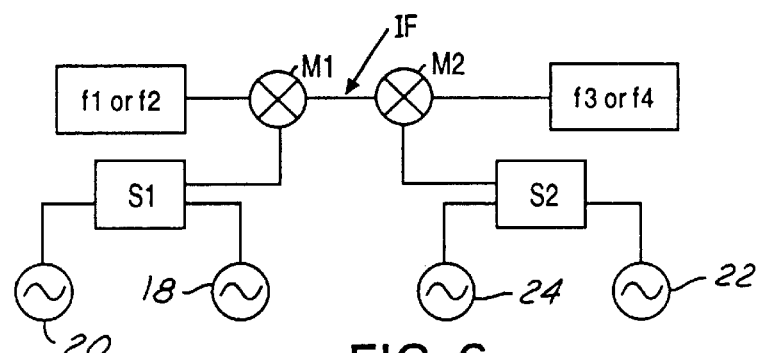
FIG. 6 is a block diagram of multiple oscillators to handle variable up and down conversion frequencies with a common IF.

In some applications it is necessary to handle different uplink and downlink frequencies on the same downconverter. The dual conversion arrangement can be modified such that the oscillator that mixes with the uplink signal can also vary. FIG. 6 is an example of multiple oscillators to handle variable up and down conversion frequencies with a common intermediate frequency. The uplink signal has a variable frequency, f1 or f2. The uplink signal is mixed, by mixer M1, with an intermediate frequency (IF), fed by one of two oscillators 18 or 20 and a switch S1 to select between the oscillators 18 and 20. The uplink signal is then converted to the intermediate frequency (IF). Another mixer M2 mixes the intermediate frequency (IF) with a signal from one of a plurality of oscillators 22 and 24, selectable by switch S2. In the example shown in FIG. 6, the oscillators 22 and 24 operate at frequencies f3-IF and f4-IF respectively. The result is a variable down link signal, in the example shown either f3 or f4. While only four oscillators are shown in the present example, it is to be understood that any number of oscillators is possible, resulting in any number of possible output frequencies.

Figure 7:
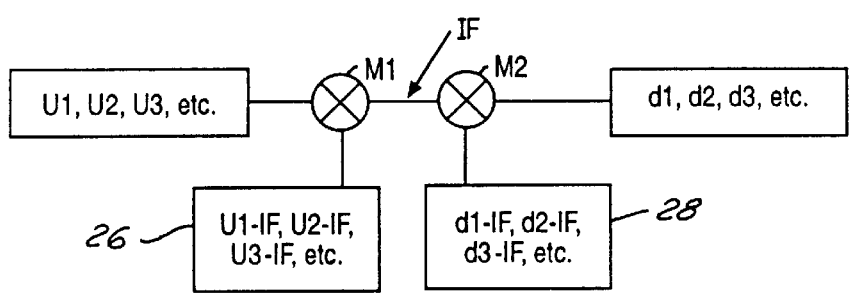
FIG. 7 is a block diagram of a dual conversion synthesizer topology with a common IF.

Multiple oscillators are one way to generate multiple downconversion frequencies. An alternative to multiple oscillators is the use of synthesizers. Synthesizers generate an arbitrary frequency within a specified range of frequencies and fixed step size. Therefore, a single synthesizer can replace a single, or many oscillators. FIG. 7 is a block diagram of this arrangement.

The system has an uplink signal having a frequency u1, u2, u3, etc. A synthesizer 26 produces a signal u1-IF, u2-IF, u3-IF, etc and is mixed with the uplink signal by mixer M1. The uplink signal is now converted to the intermediate frequency IF. The intermediate frequency IF is mixed in mixer M2 with a signal from another synthesizer 28 that is capable of generating a signal d1-IF, d2-IF, d3-IF, etc. The output of mixer M2 is the downlink signal d1, d2, d3, etc. In FIGS. 4 through 7 the intermediate frequency was assumed to be lower than the receive frequency for the purpose of illustration. In practice, the intermediate frequency (IF) may be higher or lower than the receive frequency as long as the resulting intermediate frequency (IF) yields a spur free region to translate to the final desired output frequency. Either approach may be used.

Figure 8:
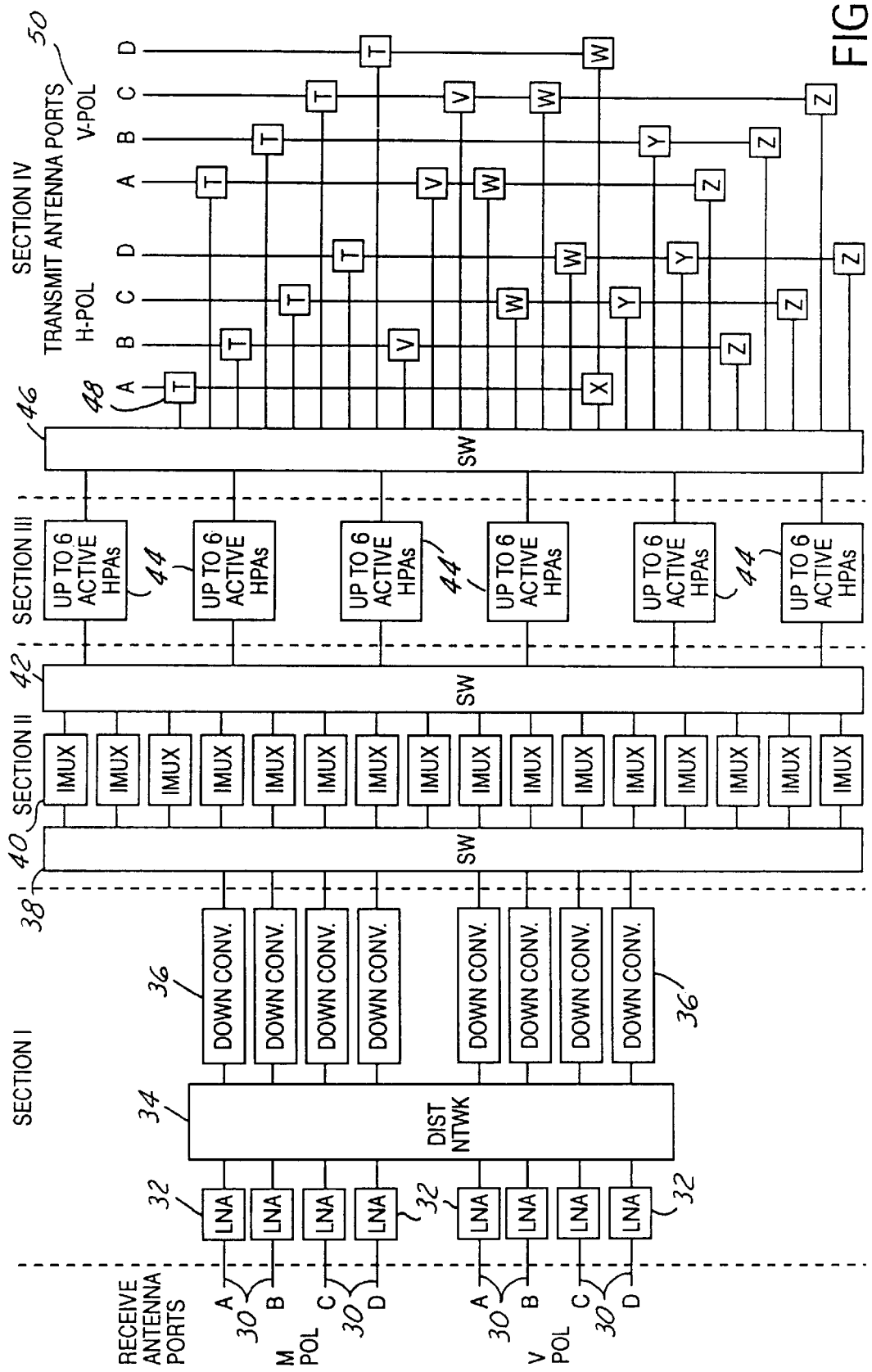
FIG. 8 is a block diagram of a reconfigurable payload.

The last piece of the present invention lies in proper filter technologies. In order to accommodate operation in a wide portion of the allocated spacecraft transmit spectrum, input and output channel filters are required for each possible broadcast channel. It is possible to select filters that cover the entire bandwidth contiguously. This provides the most efficient scenario. FIG. 8 is a block diagram of a repeater for a reconfigurable satellite of the present invention, and can be used to explain the filtering technology.

The input channel filters 40, or IMUX, separate the wideband uplink signal into multiple channels. The signals are low power, and losses are not a major concern at low power levels. Therefore, these filters are easily selectable. In operation the signal is passed through each channel where a passband of the filter selects and routes the proper signal. All other signals are reflected back into a circulator and passed onto the next channel filter.

The output channel filters 48, or OMUX, combine amplified signals and route the signal to the antenna. The output channel filters are high power. The number of channels should be limited to approximately twenty (20) adjacent channels for practical purposes. Theoretically, there is no limit to the number of contiguous OMUX filters, but for practical design considerations, the number should be limited until current the current state of the art is enhanced enough to make more channels cost effective. OMUX filters deal with signals that are at very high power levels. High power results in the generation of heat and the must be dissipated. Additionally, operating at high power means that losses become more critical.

In the preferred embodiment, to accommodate more channels using existing technology and still avoid excessive heat and losses while maintaining realistic costs, it is necessary to combine multichannel continuous OMUX filters with diplexed groups of contiguous OMUX filters. Gaps must be present in the diplexed frequency region in order for minimum insertion losses. It is also possible to include tunable filters or high/low pass filters as alternatives to diplexers. In the future there may be technology that allows contiguous filters with more channels that will simplify the present invention.

It may not always be desirable for the satellite to operate near the full number of possible channels in a given configuration. In such cases, there will be more filters than active channels. A reduced number of active channels permits fewer high power amplifiers to be implemented in the payload. A switching system 42 and 46 that allows different amplifiers to be switched to and from different filters depending the desired satellite configuration is incorporated. High power microwave switches make it possible to use the same high power amplifier with multiple filters. The routing from switches to amplifiers and filters is accomplished with either coaxial cables or waveguide.

Referring to FIG. 8 in detail, there is shown a block diagram of one embodiment of a repeater for the reconfigurable satellite of the present invention. The example diagram in FIG. 8 is capable of mimicking any one of six satellites in a fleet of satellites. It should be noted that while this example of backing up any one of six satellites is shown, the present invention can be applied to mimic any number of satellites, or can be used as a stand alone satellite for in-orbit flexibility.

Section I of FIG. 8 establishes the repeater noise figure, converts signals from the receive band to the transmit band and provides a substantial portion of the repeater gain. In the present example, Section I accepts input signals at eight antenna ports 30. The signals are routed through low noise amplifiers 32 to a network 34 which combines the received beams in any desired combination for the flexible antenna coverage discussed above. Downconverters 36 handle various frequencies and can perform any one of six conversions required by a satellite fleet of six satellites and provide the variable downconversion discussed above.

Section II accepts the signal sets from Section I and divides them into channelized portions using input multiplexer filters. This is done by a set of switches 38 that route the various Section I outputs to the appropriate input filters 40. After filtering, the channelized signals, which can be up to thirty-six (36) channels, are routed through a traveling wave tube (TWT) input redundancy ring. Each box in the block diagram represents six (6) input filters 40. A total of ninety-six (96) input filters are used to provide the required frequency plan flexibility. The channelized output signals are routed through another set of switches 42 to Section III.

Section III provides the channelized gain control, TWT linearization, and amplification to the TWT output levels of 140 Watts. An equalization network (not shown) may also be included with each TWT to equalize its frequency response over the transmit bandwidth. This permits broadband linearization of the TWT's. Each box in Section III represents a set of six active TWT's with linearizers, or high power amplifiers, 44, also known as OMUX filters.

Section IV accepts the amplified output signals from the TWT's and routes them through the output portion of the redundancy ring to the output multiplexer selection switches 46. These switches 46 are used to configure the repeater to emulate any of the six satellites in the fleet. The switches access up to four multiplexers for each polarization. Each output multiplexer box represents six (6) output filters 48. A total of one hundred fifty-six (156) output filters 48 are used in the output multiplexers to achieve the versatility in the frequency spectrum. The section IV outputs are connected to transmit antennas 50.

The combination of the flexible antenna system, the variable downlink conversion system and the selectable filter technology allow a single satellite to be reconfigured to mimic any other satellite in a fleet of satellites. This allows a single satellite to provide backup for any one satellite that may fail in fleet. The reconfigurable satellite of the present invention provides backup coverage without having to interrupt service and force users to use alternative satellite operators to continue their service. The backup coverage provided by the reconfigurable satellite of the present invention is accomplished with minimal interruption of service and without the impractical expense of having a unique spare for each satellite of a fleet.

While particular embodiments of the invention have been shown and described, numerous variations and alternate embodiments will occur to those skilled in the art. Accordingly, it is intended that the invention be limited only in terms of the appended claims.

What is claimed is:

1. A reconfigurable satellite for modifying predetermined characteristics of a payload, the reconfigurable satellite comprising:

an antenna system having a flexible coverage pattern;

a variable analog signal converter system for converting a first predetermined frequency to a second predetermined frequency;

filter means for isolating selected input and output channels; and whereby the predetermined characteristics of the payload can be modified by changing the flexible coverage pattern, varying first and second predetermined frequencies and filtering the input and output channels while the satellite is in orbit, the modified predetermined characteristics of the payload mimic predetermined characteristics of a failed satellite such that the reconfigurable satellite provides a backup means for the failed satellite with minimal interruption in satellite service.

2. The reconfigurable satellite as claimed in claim 1 wherein the antenna system further comprises a dual reflector antenna that is steerable, rotatable and defocusable.

3. The reconfigurable satellite as claimed in claim 2 wherein the dual reflector antenna is a standalone antenna.

4. The reconfigurable satellite as claimed in claim 2 wherein the dual reflector antenna is used in a farm of antennas.

5. The reconfigurable satellite as claimed in claim 1 wherein the antenna system further comprises a single reflector antenna that is steerable, rotateable, and defocusable.

6. The reconfigurable satellite as claimed in claim 5 wherein the single reflector antenna is a standalone antenna.

7. The reconfigurable satellite as claimed in claim 5 wherein the single reflector antenna is used in a farm of antennas.

8. The reconfigurable satellite as claimed in claim 1 wherein the antenna system further comprises a reconfigurable phased array.

9. The reconfigurable satellite as claimed in claim 8 wherein the reconfigurable phased array is a direct radiating antenna system.

10. The reconfigurable satellite as claimed in claim 8 wherein the reconfigurable phased array is reflecting off a dual antenna system.

11. The reconfigurable satellite as claimed in claim 8 wherein the reconfigurable phased array is reflecting off a single antenna system.

12. The reconfigurable satellite as claimed in claim 1 wherein the variable signal converter further comprises:
   a plurality of oscillators each operating at a different predetermined frequency equal to the difference between a first predetermined frequency and a second predetermined frequency;
   a first mixer connected to each of the plurality of oscillators for mixing the first predetermined frequency with one of the different predetermined frequencies of the plurality of oscillators;
   a switch connected between at the at least one mixer and each of the plurality of oscillators, the switch for selecting one of the plurality of oscillators;
   whereby the mixer produces an output equal to the second predetermined frequency.

13. The reconfigurable satellite as claimed in claim 12 wherein the variable signal converter further comprises:
   an oscillator operating at a different predetermined frequency to be mixed with the first predetermined frequency;
   a second mixer connected to the oscillator for mixing the first predetermined frequency and the different predetermined frequency and output an intermediate frequency;
   whereby the intermediate frequency is mixed with one of the frequencies of the plurality of oscillators to produce the second predetermined frequency.

14. The reconfigurable satellite as claimed in claim 13 wherein the variable signal converter further comprises:
   a plurality of oscillators each operating at a different predetermined frequency to be mixed at the second mixer with the first predetermined frequency;
   a switch connected to each of the plurality of oscillators and the second mixer for selecting one of the plurality of oscillators;
   whereby the second mixer produces an output equal to the intermediate frequency.

15. The reconfigurable satellite as claimed in claim 1 wherein the variable signal converter further comprises:
   the first predetermined frequency being one of a plurality of frequencies;
   a first synthesizer for generating an output to be mixed with the plurality of first predetermined frequencies;
   a first mixer connected between the plurality of first predetermined frequencies and the first synthesizer for mixing the plurality of first predetermined frequencies with the output of the first synthesizer to produce an intermediate frequency;
   a second synthesizer for generating an output to be mixed with the intermediate frequency;
   a second mixer for mixing the intermediate frequency and the output of the second synthesizer to produce a plurality of second predetermined frequencies.

16. The reconfigurable satellite as claimed in claim 1 wherein the filter means further comprises:
   a network of switches for routing a signal through the input channels;
   a plurality of input multiplexer filters selected by the network of switches for channelizing the input channels;
   a network of switches for routing the signal from the input multiplexer filters to a plurality of output multiplexer filters;
   a network of switches that accepts an output signal from the plurality of output multiplexer filters and reconfigures the payload.

* * * * *